United States Patent [19]

Yokoyama

[11] Patent Number: 5,144,852
[45] Date of Patent: Sep. 8, 1992

[54] STRUCTURE FOR MOUNTING A BASE PLATE MADE OF SYNTHETIC RESIN AND HAVING A SHIFT LEVER MECHANISM OF AN AUTOMATIC TRANSMISSION, ON THE FLOOR OF VEHICLE

[75] Inventor: Yoshinobu Yokoyama, Aichi, Japan

[73] Assignee: Kabushiki Kaisha Tokai Rika Denki Seisakusho, Aichi, Japan

[21] Appl. No.: 733,670

[22] Filed: Jul. 22, 1991

[30] Foreign Application Priority Data

Jul. 26, 1990 [JP] Japan .................. 2-79357[U]

[51] Int. Cl.⁵ .............................. B60K 20/00
[52] U.S. Cl. .................... 74/473 P; 74/473 R; 248/346; 248/903
[58] Field of Search ........... 74/473 P, 473 R; 248/346, 903, 635, 231.9, 231.91; 441/103, 105, 132, 367; 403/261, 192, 194, 201, 41

[56] References Cited

U.S. PATENT DOCUMENTS 3,918,316 11/1975 Reinhold et al. ............... 74/473 P
4,646,585 3/1987 Strohmeyer et al. ......... 74/473 P X
4,711,135 12/1987 Horiuchi et al. ................ 74/473 R
5,056,748 10/1991 Meyer ............................. 248/903

FOREIGN PATENT DOCUMENTS 46134 8/1932 Denmark ........................ 248/346

Primary Examiner—Rodney H. Bonck
Attorney, Agent, or Firm—Sixbey, Friedman, Leedom & Ferguson

[57] ABSTRACT

Disclosed herein is a structure for mounting a base plate made of a synthetic resin on the floor of a vehicle, the base plate being used to support thereon a shift lever mechanism of an automatic transmission. This type of structure includes metallic cylindrical collars each having a diameter larger than the maximum dimension of any one of a plurality of through holes among which holes of different diameters are included, and formed with at least one projecting portion at one end thereof, and a plurality of storage recesses respectively disposed around each of the plurality of through holes on the base plate, and having through cuts in which the collars are accommodated and into which the projecting portions are inserted, the through cuts extending through the base plate. Thus, the metallic cylindrical collars, which are identical in shape and size, can be accommodated in all the storage recesses, regardless of the shape or size of their corresponding through holes.

17 Claims, 4 Drawing Sheets

STRUCTURE FOR MOUNTING A BASE PLATE MADE OF SYNTHETIC RESIN AND HAVING A SHIFT LEVER MECHANISM OF AN AUTOMATIC TRANSMISSION, ON THE FLOOR OF VEHICLE

BACKGROUND OF THE INVENTION

1. Field of the Invention

The present invention relates to a structure for mounting a base plate made of a synthetic resin and having a shift lever mechanism of an automatic transmission, on the floor of a vehicle such as an automobile, etc.

2. Description of the Related Art

A shift lever device used for a vehicle on which an automatic transmission is mounted has a shift lever mechanism which is supported on a base plate made of a synthetic resin, and which is used to change a shift lever position to any one of a parking position, a reverse position, a neutral position, and a drive position. The base plate has a plurality of through holes for passing respective bolts therethrough. The base plate is mounted on the floor of a vehicle by inserting the bolts into their corresponding through holes and causing the bolts to threadedly engage with corresponding nuts welded in advance on the vehicle floor.

When the base plate made of the synthetic resin is fastened directly with bolts, it is destroyed or deformed by the fastening torque of each bolt. Therefore, the fastening force of each bolt is restricted by the insertion of metallic collars into the through holes, whose respective ends extend axially with respect to the bolts.

When it is desired to mount the base plate on the floor, the through holes referred to above include some which are different in diameter from one another so that the base plate may be moved as needed to enable the positioning of the base plate on the floor. When through holes for bolts are defined in the four corners of a base plate shaped substantially in the form of a rectangle, for example, one of these through holes is defined as a circular hole having a diameter capable of accommodating one of the collars whose inside diameter coincides with the axial diameter of one of the bolts. In addition, the other of these through holes defined at the diagonally opposite corner with respect to the circular one accommodating the collar referred to above is defined as an elongated hole whose longitudinal dimension corresponds to a diagonal line between the two holes mentioned thus far in such a way that any variation in the position of the bolt which passes therethrough can be absorbed or eliminated and the base plate can be reliably positioned on the floor. Furthermore, each of the remaining two through holes is defined as a large-diameter circular hole in such a way that each bolt is loose-fit therein. In addition, three kinds of collars have been fabricated according to the above-described three kinds of through holes for the bolts.

The procedure for mounting the base plate on the floor of the vehicle is carried out in the following manner. Specifically, collars of a number of kinds corresponding to each different type of through hole for the bolts are press-fitted into the through holes. Then, a bolt is inserted into the collar which is inserted into and defined in the form of the circular hole defined above, and is caused to loosely, threadedly engage with a corresponding nut welded on the floor. Under this condition, the base plate is pivoted on the attached bolt so as to place the elongated hole in alignment with a corresponding nut welded on the floor. Thereafter, a second bolt is inserted into the collar which is inserted into and defined in the form of the elongated hole so as to threadedly engage the corresponding nut welded on the floor. Then, bolts are loose-fit into the remaining collars each inserted in and defined in the form of the large-diameter circular holes so as to be placed in alignment with the nuts welded on the floor, and the bolts are caused to threadedly engage with their corresponding nuts. Finally, all the bolts are tightened.

The base plate can be reliably mounted at a predetermined position on the floor in this way. In addition, the fastening torque of each bolt to the base plate is kept constant by the corresponding collar.

However, the conventional structure constructed as described above needs various type of collars having shapes corresponding to the different shapes of the through holes. In the case of the above structure, an assembling process is carried out by providing three kinds of collars and holding them in alignment with their corresponding through holes. Therefore, the efficiency of assembly is poor. Since identical components are not used for respective fastening points, the manufacturing cost of the components is increased.

SUMMARY OF THE INVENTION

With the foregoing problems in view, it is an object of the present invention to provide a structure for mounting a base plate made of a synthetic resin on a vehicle floor with improved efficiency of assembly, by making use of only on kind of collar without reducing the ease of positioning of the base plate on the vehicle floor.

According to one aspect of the present invention, there is provided a structure for mounting a base plate made of a synthetic resin on the floor of a vehicle, the base plate being used to support thereon a shift lever mechanism capable of selectively shifting gear positions of an automatic transmission, the structure comprising a plurality of through holes defined in the base plate, at least some of the plurality of through holes being different in diameter from each other in such a manner that axial members used to fixedly secure the base plate to the floor by extending through the through holes and the base plate and down to the floor, can be positioned; metallic cylindrical collars each having a diameter larger than the maximum diameter of any one of the plurality of through holes and formed with at least one projecting portion at one end thereof; and a plurality of storage portions disposed around the plurality of through holes on the base plate and having through cuts extending through the base plate, said through cuts being used to accommodate the collars therein and also for the insertion of at least one of the projecting portions of the collars referred to above therein.

According to the above arrangement, the plurality of through holes defined in the base plate include some whose diameters are different from each other so that they can be moved to a position in alignment with base plate attachments on the vehicle floor by which the base plate is to be mounted on the floor. In addition, the metallic cylindrical collars each having a diameter larger than the maximum diameter of any one of these through holes are stored in the storage portions disposed around the plurality of through holes, and at least one of the projecting portions referred to above is inserted into each of the through holes of these storage recesses. Thus, when the base plate is mounted on the vehicle floor by means of the axial members, at least one projecting portion of each collar is brought into contact with the floor, for example, and the pressing force applied to the base plate at the time that it is mounted on the floor is thereby restricted. Therefore, the base plate made of the synthetic resin is not destroyed or damaged.

As described above, each of the collars has a diameter larger than the maximum diameter of any one of the through holes. Therefore, collars having the same diameters can be used in association with all the through holes, and the base plate can be mounted on the floor by using only one kind of collar. As a consequence, cumbersome processes such as matching of the size of each collar and hole, selection of any particular one of the collars, etc. can be eliminated at the time that the base plate is mounted on the floor, thereby making it possible to greatly improve the efficiency of assembly.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
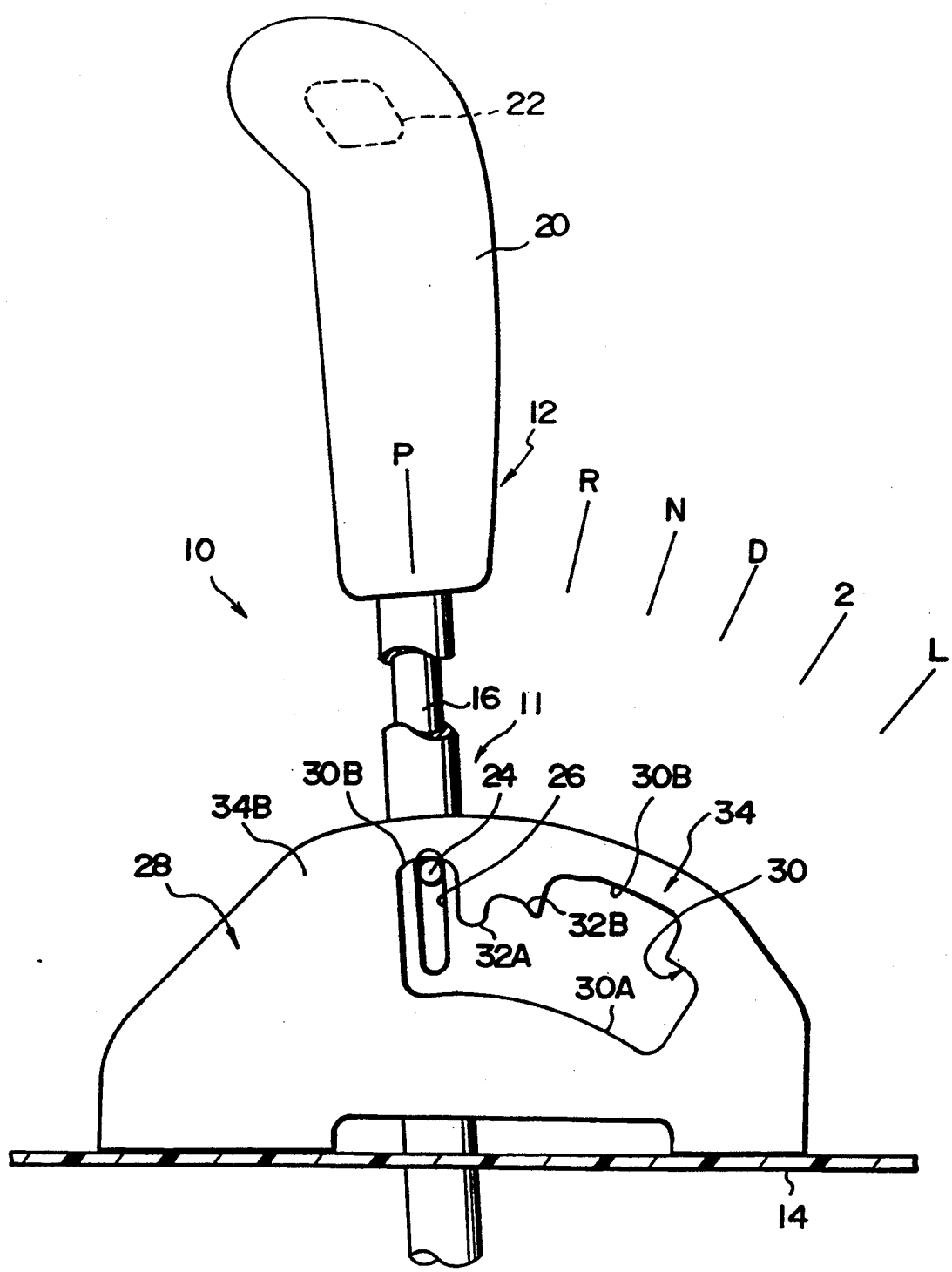
FIG. 1 is a side view of a shift lever device for a vehicle, to which the present invention is applied.

FIG. 1 shows one embodiment of a shift lever device 10 for a vehicle automatic transmission, to which the present invention is applied.

The shift lever device 10 has a shift lever 12 serving as a part of a shift lever mechanism 11, whose shift positions are arranged in order of a parking position (hereinafter called "P position"), a reverse position (hereinafter called "R position"), a neutral position (hereinafter called "N position"), a drive position (hereinafter called "D position"), a second position (hereinafter called "2 position"), and a low position (hereinafter called "L position") as seen in a left to right arrangement (i.e., a clockwise direction) in FIG. 1.

The shift lever 12 has a lower end portion rotatably supported on an axially-extending intermediate portion of a shaft (not shown) disposed in such a manner that its axial dimension is perpendicular to the axial dimension of the shift lever 12 (i.e., its axial dimension is normal in FIG. 1). In addition, the shift lever 12 can be swingably moved about the shaft so as to select a desired shift position. The shaft is supported on an unillustrated bracket mounted on a base plate 14.

The shift lever 12 includes a detent rod 16 slidably disposed in its inside along the axial dimension thereof. When a shift button 22 mounted on a shift operation knob 20 of the shift lever 12 is pressed, the detent rod 16 is pressed in the downward direction of FIG. 1. The detent rod 16 has a detent pin 24 fixedly secured to a lower end thereof. The detent pin 24 can assume two positions, i.e., one position in the case where the shift button 22 is not pressed and the other position in the case where it is pressed.

The detent pin 24 penetrates an elongated slot 26 defined in the shift lever 12 and has one end which projects outward from the shift lever 12. A detent plate 28 mounted upright on the base plate 14 is disposed in front of the shift lever 12 in the plane of the sheet as seen in FIG. 1.

The detent plate 28 has a detent opening 30 defined in an intermediate portion thereof, and the detent pin 24 extends through the detent opening 30. The detent opening 30 has a lower edge 30A formed in a gradual arcuate configuration, and an upper edge 30B formed with concave and convex restriction portions 32A, 32B, respectively. When the detent pin 24 is located in the P position and the shift button 22 is not pressed, the restriction portion 32A serves to limit any displacement of the detent pin 24 and therefore the shift lever 12 in the right-hand (i.e., clockwise) direction in FIG. 1. On the other hand, when the detent pin 24 is in the N position and the shift button 22 is not pressed, the restriction portion 32B serves to restrict any displacement of the shift lever 12 in the left-hand direction (counterclockwise in FIG. 1), i.e., in the direction of the R position. When the shift button 22 is pressed, the detent rod 16 is moved in the downward direction in FIG. 1 against an urging force of a return spring (not shown), so that the detent pin 24 is released from being restricted by either the restriction portion 32A or the restriction portion 32B. Under this condition, the detent pin 24 can be moved in the left-hand or right-hand directions in FIG. 1 within the detent opening 30. Thus, when the shift lever 12 is swingably operated, the detent pin 24 is displaced in the left-hand or right-hand directions in FIG. 1 within the detent opening 30, so that the shift lever 12 is moved to a desired shift position. On the other hand, when the shift button 22 is in a non-pressed state, the detent pin 24 is brought into contact with the upper edge 30B by the urging force of the return spring, and hence the shift lever 12 is held in a corresponding shift position.

When the detent pin 24 is brought into contact with the upper edge 30B in the non-pressed state of the shift button 22 in the above-described manner, the movement of the detent pin 24 is restricted so as to impose a limitation on the pivotal movement of the shift lever 12.

Figure 2:
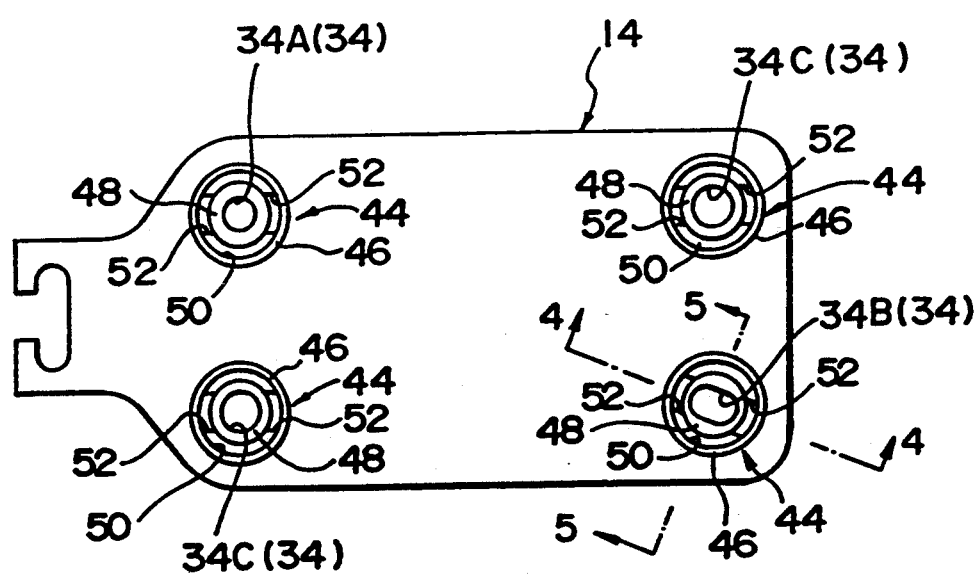
FIG. 2 is a plan view of a base plate.
Figure 4:
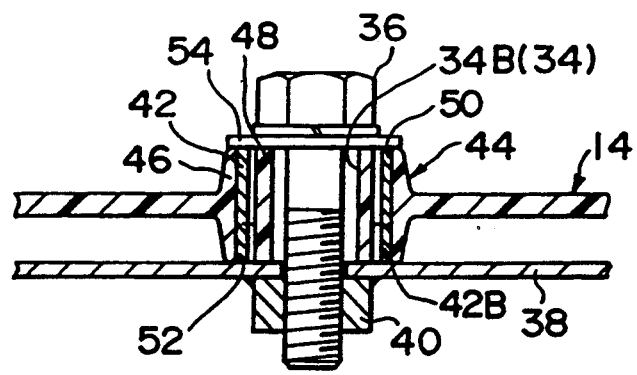
FIG. 4 is a cross-sectional view taken along line 4—4 of FIG. 2.
Figure 5:
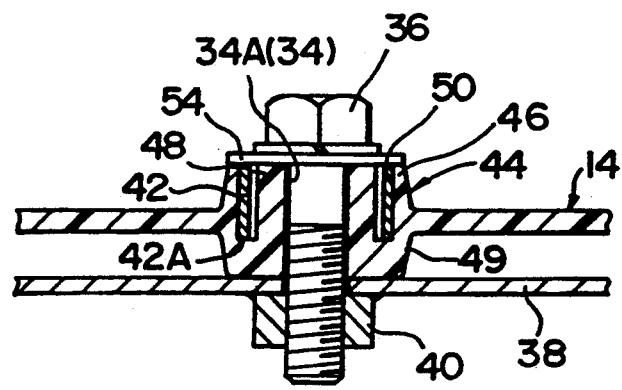
FIG. 5 is a cross-sectional view taken along line 5—5 of FIG. 2.

As shown in FIG. 2, the base plate 14 is formed of a synthetic resin, and fixed to the floor of the vehicle in a state in which it is placed thereon. The base plate 14 is fixed to the floor in the following manner. Specifically, bolts 36 (see FIGS. 4 and 5) are caused to extend through or fit into through holes 34 defined in the four corners of the base plate 14, and to threadedly engage with corresponding nuts 40 welded in advance on the underside of the vehicle floor 38, whereby the fixing of the base plate 14 to the floor is completed.

The through holes 34 have three kinds of shapes: one of the four through holes 34 is defined as a circular hole 34A having substantially the same diameter as the outside diameter of the bolts 36, another one of them is defined as an elongated hole 34B defined in parallel to a diagonal line between itself and the circular hole 34A, and the remaining two thereof are defined as circular holes 34C having a diameter larger than the outside diameter of the bolts 36. When it is desired to fix the base plate 14 to the floor using the bolts 36, one of the bolts 36 is first caused to extend through the circular hole 34A and to loosely, threadedly engage with a corresponding nut 40. Then, the base plate 14 is pivoted about the circular hole 34A in order to set the elongated hole 34B in position, thereby enabling the bolt 36 to penetrate into the elongated hole 34B so as to threadedly engage with a corresponding nut 40. Since each circular hole 34C is large in diameter, the bolt 36 can be easily threadedly engaged with a corresponding nut 40. In other words, the outside diameters of the through holes 34 are determined so as to make it easy to position the base plate 14.

As shown in FIG. 2, the maximum dimension among the dimensions of the through holes 34 corresponds to the major axis of the elongated hole 34B. In the present embodiment, collars 42 having inside diameters each of which is larger than the major axis of the elongated hole 34B, are disposed around corresponding through holes 34. Collar storage portions 44 for storing or accommodating the collars 42 therein are correspondingly formed in the base plate 14. Each of the collar storage portions 44 includes ring-shaped cylindrical members 46, 48 having large and small diameters, which are disposed around the respective through holes 34A, 34B, 34C, 34D respectively. Portions of the underside of the base plate 14, which corresponds to the cylindrical members 46, 48, are shaped in the form of thick cylindrical members 49.

Figure 3:
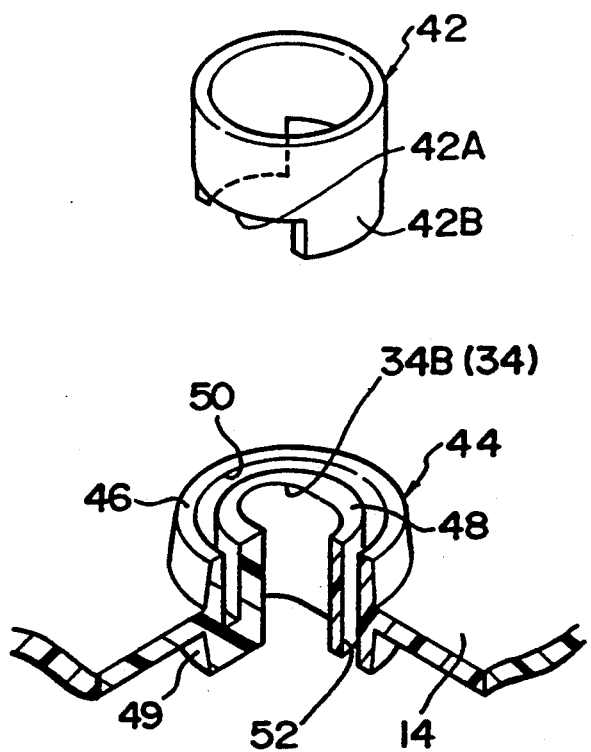
FIG. 3 is an exploded perspective view of a collar and a collar storage portion in which the collar is to be incorporated.

The large-diameter cylindrical member 46 has inner and outer peripheral walls which are circular in shape, whereas the small-diameter cylindrical member 48 has an outer peripheral wall which is circular in configuration, and an inner peripheral wall which forms a part of each of the through holes 34. In addition, the thick cylindrical member 49 has an inner peripheral wall which forms the remaining part of each through hole 34. A space defined between the large-diameter cylindrical member 46 and the small-diameter cylindrical member 48 is defined as a ring-shaped groove 50. The bottom of each groove 50 is defined as a pair of through cuts 52, which penetrate the thick cylindrical member 49. The through cuts 52 are defined in two locations on respectively opposite sides of the groove 50. Each of the collars 42 is accommodated in one of the grooves 50. As shown in FIG. 3, two projecting portions 42B extending downward in alignment with the through cuts 52 project downward from a lower end face 42A of each collar 42. When the collar 42 is inserted into one of the grooves 50 by press-fitting or the like, the lower end face 42A is brought into contact with the bottom face of the groove 50, i.e., the surface of the base plate 14, and the two projecting portions 42B are accommodated in the through cuts 52. In addition, each of the leading ends of the projecting portions 42B reaches a position flush with the bottom of the thick cylindrical member 49. Therefore, the projecting portions 42B are brought directly into contact with the floor 38 upon fastening of each bolt 36. The fastening force of the bolt 36 is therefore restricted to a substantially constant value by the collar 42 and excessive force is not applied to the base plate 14 as it would be in the case where a conventional collar were employed.

In addition, a washer 54 having a diameter larger than the outside diameter of each collar 42 is mounted on the base of each bolt 36. The fastening force of each bolt 36 is transmitted to the collar 42 through the washer 54.

The operation of the present embodiment will now be described below.

When the shift lever is in the P position, the shift lever 12 is held in an unmovable state by the restriction portion 32A. Then, the shift button 22 is pressed and the detent pin 24 is moved in the downward direction in FIG. 1. As a consequence, the shift lever 12 can be shifted from the P position to other positions such as R position, etc. Similarly, the shift lever 12 can be shifted to the P position only when the shift button 22 is pressed while the shift-lever is in the R position. The shift lever 12 can be shifted by its swinging operation from the 2 position to the N position or vice versa irrespective of the pressing operation of the shift button 22.

The shift lever mechanism 11 used to perform this shifting operation is supported on the base plate 14 which is fixedly secured to the floor 38 by the bolts 36. The base plate 14 is formed of a synthetic resin but securely fixed to the floor 38. The procedure for mounting the base plate 14 on the floor 38 will now be described below.

Each of the collars 42 is first inserted into its corresponding groove 50 defined around the through holes 34A, 34B, 34C, 34D of the base plate 14. Since the collars 42 are all the same in size and shape, it is unnecessary for the collars to be matched with the through holes 34 in accordance with their respective different outside diameters, and hence the efficiency of assembly is improved. Each of the through cuts 52 is defined in a part of the bottom face of the groove 50, and the two projecting portions 42B defined in the lower end face 42A of each of the collars 42 are inserted into their corresponding through cuts 52. As a consequence, the lower end face 42A of each collar 42 is brought into contact with the bottom face of the groove 50, and the projecting portions 42B reach the bottom surface of each thick cylindrical member 49, i.e., a position flush with the surface which is to be brought directly into contact with the floor 38.

The base plate 14 into which all the collars 42 have been inserted in this way is placed in position on the floor 38. At this time, the hole among the four through holes 34 which is circular, i.e., the circular hole 34A, is held in alignment with a corresponding nut 40, which has been previously mounted on the floor 38 by welding or the like. As a consequence, the bolt 36 can be inserted into the circular hole 34A so as to threadedly engage with the nut 40. Incidentally, at this time, the bolt 36 is not tightened, but is held in a partially screwed state of engagement with the nut 40, i.e., it loosely threadedly engages it.

Then, the base plate 14 is pivoted on the bolt 36 which extends through the circular hole 34A, and the elongated hole 34B is held in alignment with the corresponding nut 40 on the floor 38. The elongated hole 34B is selected as the through hole to be aligned so that even when a slight error in dimensions exists between the position where the second nut 40 is held in alignment with the elongated hole 34B and the position where the first nut 40 is held in alignment with the circular hole 34A, it is still possible to easily position the elongated hole 34B in alignment with the nut 40. As a consequence, the bolt 36 can be threadedly engaged with the nut 40 by passing the same through the elongated hole 34B.

After the two operations referred to above are completed, the remaining bolts 36 may be firmly and threadedly engaged with respectively corresponding nuts 40, without any further adjustments, thereby fixing the base plate 14 to the floor 38.

Since each of the circular holes 34C defined at the last two positions on the base plate has an outside diameter larger than that of the bolts 36, both circular holes 34C are held in alignment with the respectively corresponding nuts 40 as soon as the positioning and engaging of the first two bolts has been accomplished. It is therefore possible to cause the bolts 36 to threadedly engage with the nuts 40 with ease..

According to the present embodiment, each of the washers 54 mounted on the base of the bolt 36 is brought into contact with the upper end surface of each of the collars 42, and the floor 38 is brought into contact with each of the projecting portions 42B of each of the collars 42, thereby imposing a limitation on the fastening force of the bolt 36. Thus, the base plate 14 made of synthetic resin is not destroyed or deformed.

The collars 42 are limited to only one kind irrespective of the different outside diameters of the through holes 34. It is therefore unnecessary to cause the through holes 34 to coincide in shape with the collars 42, thereby improving efficiency of assembly. In addition, the manufacturing cost of respective components can be reduced because common components are used.

Further, since one end of each collar 42 has projections, the fastening force of the bolt 36 can be held constant. Since the respective portions or regions of the base plate 14, which are located inside and outside of each of the collars 42, communicate with each other at the bottom of each of the grooves 50, the base plate 14 can be united to form a single unit.

Incidentally, the above-described embodiment has shown and described a case in which each of the collars 42 is mounted on the base plate 14 from the upper side thereof. However, the same advantageous effects as those in the above embodiment can be brought about even when each of the collars 42 is mounted on the base plate 14 from the under side thereof, i.e., even when circular grooves 50 are defined in the base 14 from the lower side thereof, and the upper end portions of each of the collars 42 are shaped in a projecting manner.

The present embodiment has shown and described a structure for mounting a base plate made of synthetic resin on the floor of a vehicle, the base plate supporting the shift lever mechanism for the vehicle automatic transmission. However, the present invention is not necessarily limited to the present embodiment. It is clear that the present invention can be applied even to a case where a plate member formed of a synthetic resin is mounted on other members, for example.

Having now fully described the invention, it will be apparent to those skilled in the art that many changes and modifications can be made without departing from the spirit or scope of the invention as set forth herein.

What is claimed is:

1. A structure for mounting a base plate made of a synthetic resin on the floor of a vehicle, said base plate being used to support thereon a shift lever mechanism capable of selectively changing gear positions of an automatic transmission, said structure comprising:

a plurality of through holes defined in said base plate, at least some of said plurality of through holes being different in size and shape from each other in such a manner that axial members used to fixedly secure said base plate to said floor may be readily passed through said through holes and said base plate can be easily positioned with respect to said floor;

a plurality of metallic cylindrical collars each having a diameter larger than the maximum dimension of any one of said plurality of through holes and having at least one projecting portion at one end thereof; and a plurality of storage portions disposed around said plurality of through holes on said base plate and each of said storage portions having at least one through cut extending through said base plate, said plurality of storage portions being used to accommodate said collars therein and said at least one through cut being used to accommodate said at least one projecting portion therethrough.

2. A structure according to claim 1, wherein said storage portions include substantially ring-shaped grooves used to receive said collars therein.

3. A structure according to claim 2, wherein each of said grooves is defined by a pair of cylindrical members which are different in diameter from each other and each pair of said cylindrical members is disposed around one of said plurality of through holes.

4. A structure according to claim 3, wherein each of said storage portions has an opposite side, and said base plate has a plurality of ring-shaped protrusions on the opposite side of said storage portions, and each protrusion is provided at a position corresponding to each pair of said cylindrical members.

5. A structure according to claim 1, wherein said metallic cylindrical collars have respectively two projecting portions formed in two locations which are substantially opposite, and said storage portions have respectively two through cuts provided in two locations to accommodate said projecting portions in such a way as to be aligned with said two projecting portions.

6. A structure according to claim 1, wherein all of said plurality of storage portions are formed on the same face of said base plate.

7. A structure according to claim 1, wherein said base plate is shaped substantially in the form of a rectangle, and said through holes are respectively defined substantially in the corners of said base plate.

8. A structure according to claim 1, wherein a first of said plurality of through holes is defined as a circular hole having substantially the same diameter as the outside diameter of each of said axial members, and a second thereof is defined as an elongated hole whose longitudinal dimension lies on a line passing through said first and second through holes, whereas each of said remaining through holes is defined as a circular hole having a diameter larger than the outside diameter of each of said axial members.

9. A structure according to claim 1, wherein said collars are press-fitted into said storage portions respectively.

10. A structure for mounting a base plate made of a synthetic resin on the floor of vehicle, said base plate being used to support thereon a shift lever mechanism for shifting a shift lever on an automatic transmission to a desired shift position among a plurality of shift positions, said structure comprising:

a plurality of through holes defined in said base plate, at least some of said plurality of through holes being different in size and shape from each other in such a manner that a plurality of bolts threadedly engaging with corresponding nuts fixed to said floor may be readily passed through said through holes and said base plate can be easily positioned with respect to said floor;

a plurality of metallic cylindrical collars corresponding in number to the number of said plurality of through holes, said collars each having a diameter larger than the maximum dimension of any one of said plurality of through holes and having at least one projecting portion at one end thereof; and a plurality of ring-shaped grooves respectively disposed around said plurality of through holes on said base plate, each of said ring-shaped grooves having at least one through cut, said collars being respectively press-fitted into said ring-shaped grooves, and said at least one projecting portion being inserted into said at least one said through cut extending through said base plate.

11. A structure according to claim 10, wherein each of said ring-shaped grooves is defined by a pair of cylindrical members which are different in diameter from each other and each pair of said cylindrical members is disposed around one of said plurality of through holes.

12. A structure according to claim 11, wherein said base plate has a plurality of ring-shaped protrusions on the other side of said ring-shaped grooves, each of said ring-shaped protrusions is associated with said pair of cylindrical members.

13. A structure according to claim 10, wherein each of said metallic cylindrical collars has two projecting portions formed in two locations which are substantially opposite, and each of said ring-shaped grooves has two through cuts provided in two locations to accommodate said projecting portions in such a way as to be aligned with said two projecting portions.

14. A structure according to claim 10, wherein all of said plurality of ring-shaped grooves are defined in the same face of said base plate.

15. A structure according to claim 10, wherein said base plate is shaped substantially in the form of a rectangle, and said through holes are respectively defined substantially in the corners of said base plate.

16. A structure according to claim 15, wherein a first of said plurality of through holes is defined as a circular hole having substantially the same diameter as the outside diameter of each of said bolts, and a second thereof defined at a diagonally opposite position of said base plate with respect to said first through hole is defined as an elongated hole whose longitudinal dimension lies on a diagonal line passing through said first and second holes, whereas each of said remaining through holes is defined as a circular hole having a diameter larger than the outside diameter of each of said bolts.

17. A structure according to claim 10, wherein said collars are press-fitted into said through cuts respectively from a side of said base plate which is opposite to said floor.

* * * * *